United States Patent [19]

Asai

[11] 4,446,937

[45] May 8, 1984

[54] METHOD OF TREATING COMBINATION DEFECTIVENESS IN COMBINATORIAL WEIGHING OR COUNTING

[75] Inventor: Yoshiharu Asai, Kurita, Japan

[73] Assignee: Kabushiki Kaisha Ishida Koki Seisakusho, Kyoto, Japan

[21] Appl. No.: 355,545

[22] PCT Filed: Aug. 26, 1981

[86] PCT No.: PCT/JP81/00193

§ 371 Date: Feb. 23, 1982

§ 102(e) Date: Feb. 23, 1982

[87] PCT Pub. No.: WO82/00882

PCT Pub. Date: Mar. 18, 1982

[30] Foreign Application Priority Data

Sep. 3, 1980 [JP] Japan ............................... 55-122556

[51] Int. Cl.³ ............................................ G01G 19/22

[52] U.S. Cl. .......................................... 177/1; 177/25

[58] Field of Search ............................ 177/25, 1, 123

[56] References Cited

U.S. PATENT DOCUMENTS 4,308,928 1/1982 Oshima ........................... 177/123 X
4,341,274 7/1982 Hirano et al. ....................... 177/25

Primary Examiner—George H. Miller, Jr.
Attorney, Agent, or Firm—Armstrong, Nikaido, Marmelstein & Kubovcik

[57] ABSTRACT

A method of treating combination defectiveness in combinatorial weighing or counting. In cases where no combination which satisfies a set value is obtained, the amounts of articles in one or more of the combinatorial weighing or counting machines are automatically increased or decreased without stopping such machine or machines and recomputations are performed.

12 Claims, 4 Drawing Figures

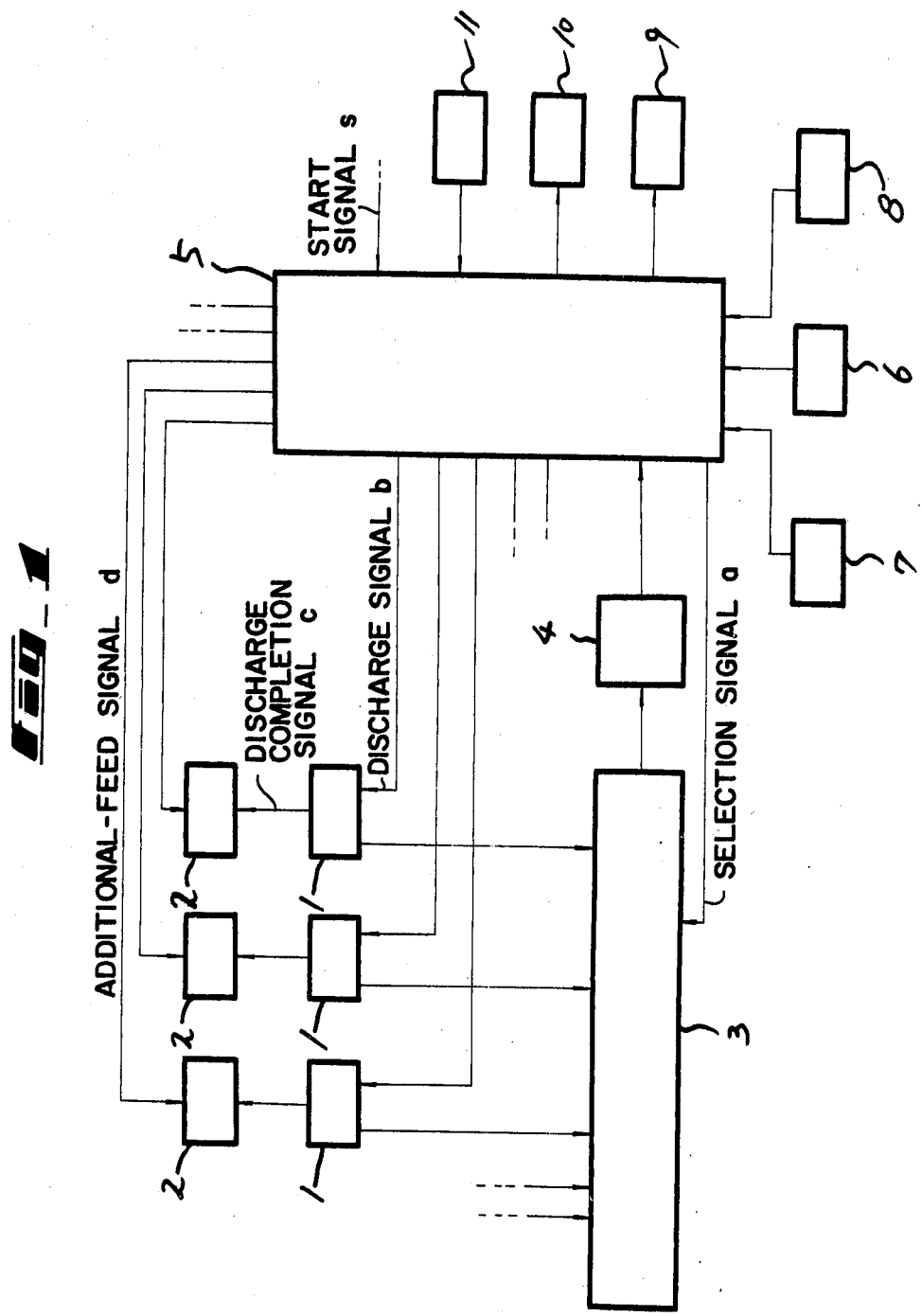

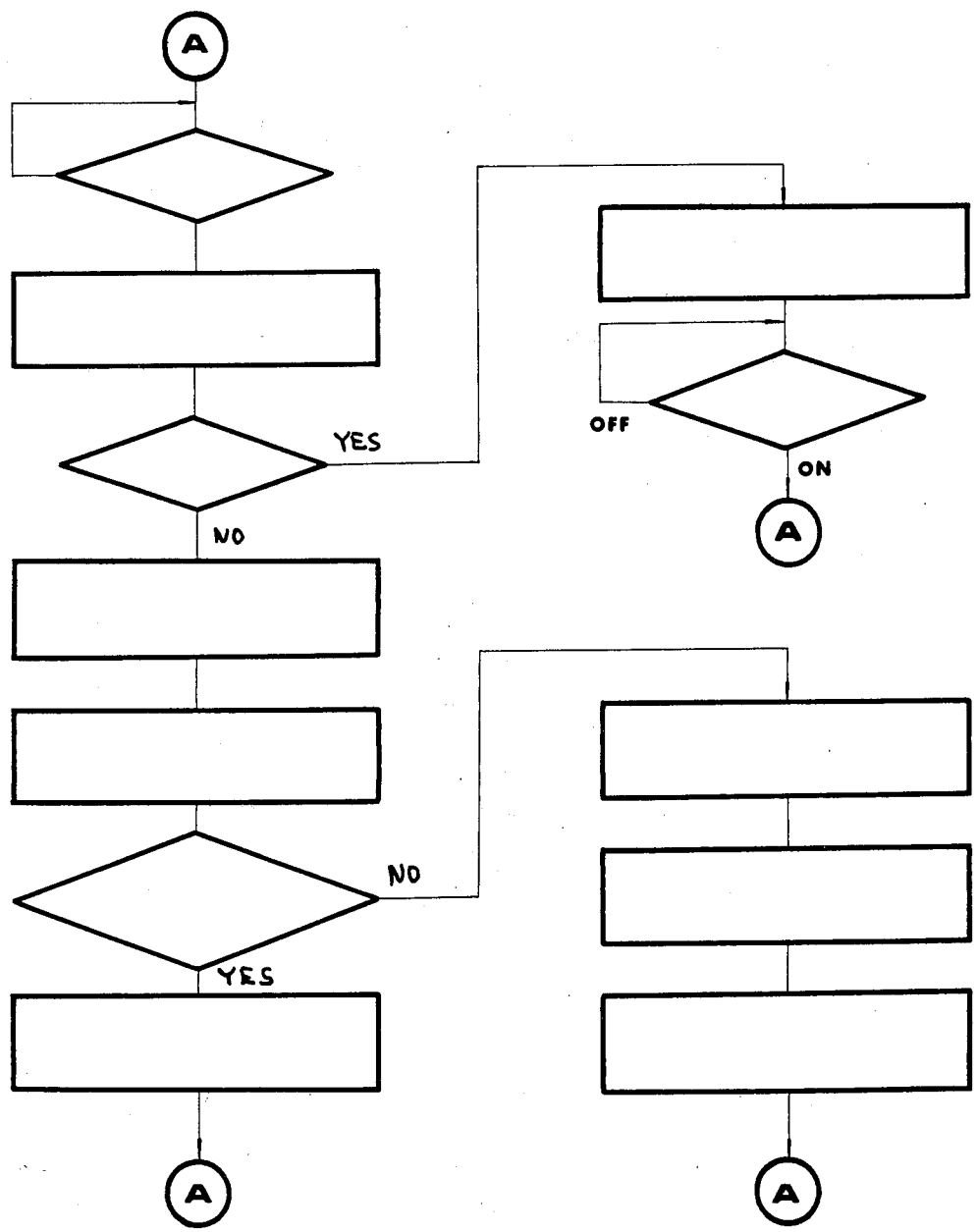

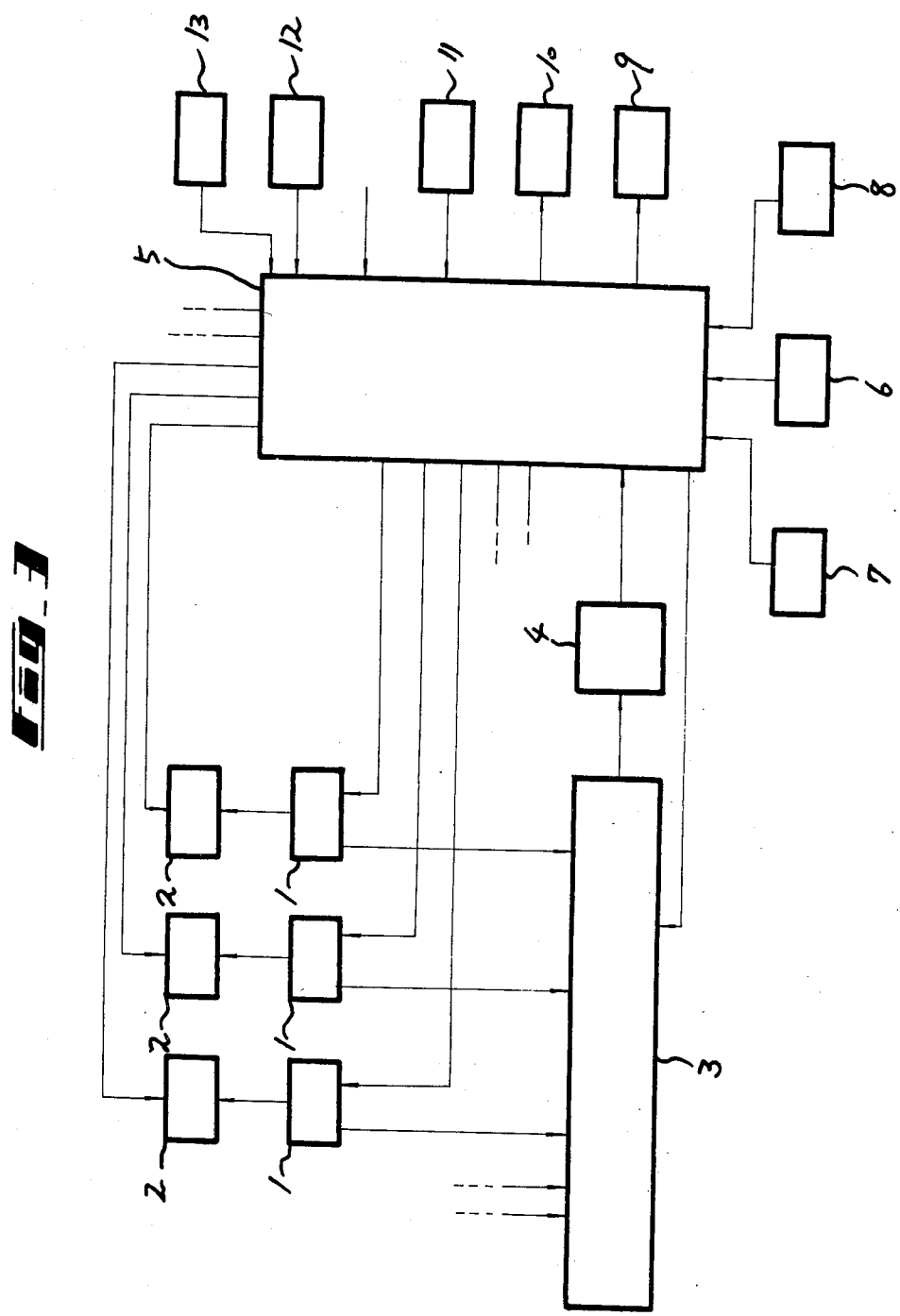

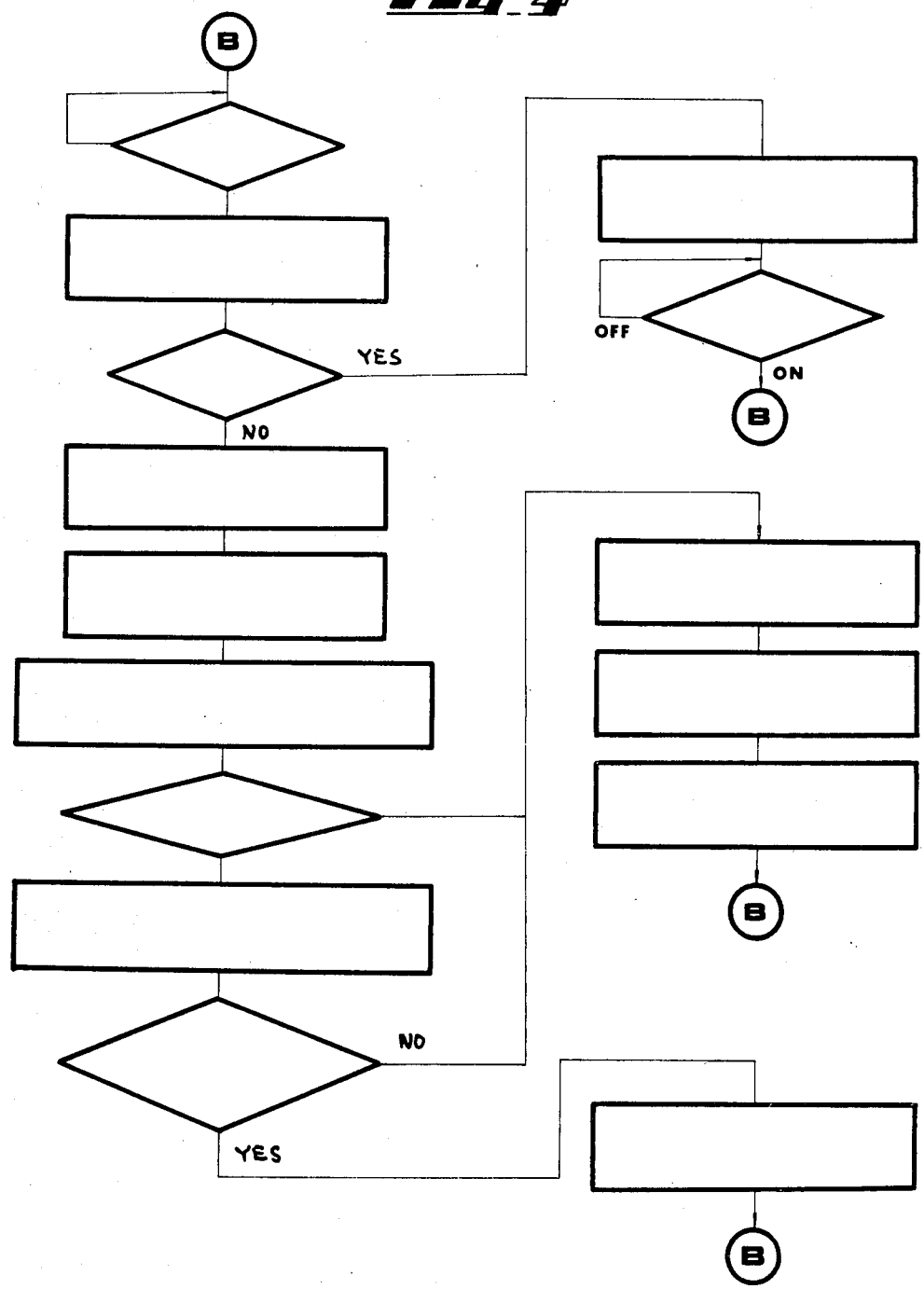

METHOD OF TREATING COMBINATION DEFECTIVENESS IN COMBINATORIAL WEIGHING OR COUNTING

BACKGROUND OF THE INVENTION

The present invention relates to a mentod of treating combination defectiveness in combinatorial weighing or counting. More particularly, it relates to a method of treating combination defectiveness, which does not provide a combination which satisfies a set value in combinatorial weighing or counting, by increasing or decreasing the amounts of articles in one or more of weighing machines, to enable recomputations to be performed without stopping the machine or machines.

By combinatorial weighing is meant a mode of weighing in which when it is desired to obtain a set of articles which has a desired weight, articles are dividedly weighed in slightly varying separate amounts by n weighing machines, combinations of the thus found weights are computed, a combination which conforms to a set weight is selected from the computed combinations, and the weighing machines corresponding to the selected combination are caused to discharge their contents, thereby providing a set of articles which has the set weight. By combinatorial counting is meant a mode of counting in which when it is desired to obtain a desired number of particular articles, articles are dividedly weighed in slightly varying separate amounts by n weighing machines, each of the thus found weights is divided by the weight of a single article to find the number of articles in each weighing machine, combinations of the numbers are computed, a combination which conforms to a set number is selected from the computed combinations, and the weighing machines corresponding to the selected combination are caused to discharge their contents, thereby providing a set of articles having the set number.

In said combinatorial weighing or counting, in cases where it is found after combinatorial computations that there is no combination which satisfies set values, such as upper and lower weight limits, there has heretofore been no means to automatically remedy the situation, the only measures that can be taken being to give an alarm as by a buzzer or to stop the machines.

To give an example of treatment of combination defectiveness in combinatorial weighing, in cases where of the combinations obtained by combinatorial computations, the one which is the nearest to the set weight is not between the upper and lower weight limits, an alarm is given by means of a buzzer or a lamp to draw the operator's attention to inhibit discharge of articles from weighing machines. In this case, however, each time combination defectiveness is found, the weighing operation has to be interrupted, which is inconvenient and inefficient.

As another example of treatment of combination defectiveness, a combination of articles which is the nearest to a set weight is automatically discharged from weighing machines into a packaging machine each time, and if such discharged combination is not between the upper and lower weight limits, an alarm is given as by ringing a buzzer to draw the operator's attention. In this case, however, since the combination of articles which is the nearest to the set weight is discharged irrespective of whether it is between the upper and lower weight limits, the setting of the upper and lower weight limits is simply intended to inform the operator that the combination weight which is the nearest to the set weight is not between the upper and lower weight limits. Therefore, if the operator fails to notice the warning, the set of discharged articles which is not between the upper and lower weight limits will be packaged. Thus, these measures cannot be called desirable.

SUMMARY OF THE INVENTION

Accordingly, the invention is intended to eliminate the prior art drawbacks by increasing or decreasing the amount of articles in one or more of the weighing machines in cases where combinatorial computations do not provide a combination which satisfies a set value, and doing combinatorial computations over again so as to automatically remedy the defective situation.

To this end, according to the present method of treating combination defectiveness in combinatorial weighing using n weighing machines to weigh articles and computing combinations of digitalized weights or in combinatorial counting which converts each of said digitalized weights into the number of articles to compute combinations of such numbers, if there is no combination which corresponds to a set value, the amount of articles in one or more of the weighing machines is increased or decreased, whereupon combinations are computed over again.

According to this invention, in digitalized combinatorial weighing or counting, if there is no combination which corresponds to a set value, the amount of articles in weighing machines is automatically increased or decreased, whereupon computations are done over again. Therefore, articles can be discharged and packaged, always with a combination corresponding to a set value.

The above and other objects and features of the invention will become more apparent from the following description given with reference to the accompanying drawings, in which:

BRIEF DESCRIPTION OF THE DRAWINGS

FIG. 1 is a block diagram showing a combinatorial weighing apparatus embodying the present invention;

FIG. 2 is a flowchart showing a program for the arithmetic and control unit in the apparatus of FIG. 1;

FIG. 3 is a block diagram showing a combinatorial counting apparatus embodying the present invention; and FIG. 4 is a flowchart showing a program for the arithmentic and control unit in the apparatus of FIG. 3.

DETAILED DESCRIPTION OF THE INVENTION

The invention will now be described in more detail with reference to a case (I) where it is applied to combinatorial weighing, a case (II) where it is applied to combinatorial counting, and a case (III) where it is applied to weight-conditioned combinatorial counting. Throughout the figures, like parts are denoted by like numerals.

A method of treating combination defectiveness in the case (I) for combinatorial weighing will first be described.

FIG. 1 shows an example of the arrangement of a combinatorial weighing apparatus. In FIG. 1, 1 denotes a plurality of weighing machines; 2 denotes feeders for feeding the weighing machines with articles with suitable variations in amount; 3 denotes a multiplexer composed of analog switches, etc.; 4 denotes an A/D converter; 5 denotes an arithmetic and control unit composed of a micro-computer, etc.; 6 denotes a weight setting section; 7 denotes an upper weight limit setting section; 8 denotes a lower weight limit setting section; 9 denotes a combination defectiveness indicator; 10 denotes an overscale indicator; and 11 denotes a recovery switch.

The operating program for the arithmetic and control unit 5 of the apparatus is as shown by a flowchart in FIG. 2. At the outset of operation, it is assumed that the weight of articles to be packaged has been set by the weight setting section 6 and that the upper and lower weight limits have been set by the upper and lower weight setting sections 7 and 8, respectively. The arithmetic and control unit 5 first checks whether a start signal s which indicates readiness for packaging has been fed in from a packaging machine. It repeatedly follows the standby loop until it judges that there is a start signal s. When a start signal is fed in, the arithmetic and control unit 5 starts operation. The weighing machines 1 have already been fed with articles with suitable variations in amount from the feeders 2 and have already weighed the respective sets of articles and delivered the weights in the form of analog signals to the multiplexer 3. In this state, the arithmetic and control unit 5 sends selection signals a to the multiplexer 3 to successively select the weighing machines 1 and allow selective passage of the weight values through the multiplexer 3. Thus, the weight values in the form of analog signals are converted into digital signals by the A/D converter 4 and stored in weight value registers respectively corresponding to the weighing machines 1. It then checks whether the stored weight values are within the weighing range of the weighing machines 1, that is, whether they are not overscale. If it is judged that they are not overscale, it computes combinations of the weight values and stores the combinations and combination weights. It then retrieves a combination that is equal to or nearest to the set weight set by the weight setting section 6 and stores it. It checks whether the combination weight in this stored combination is between the upper and lower weight limits set by the upper and lower weight limit setting sections 7 and 8. If it is found to be therebetween, the unit sends discharge signals b to the weighing machines 1 corresponding to said combination to cause them to discharge their articles, so that the latter are packaged by the packaging machine. The weighing machines 1 which have discharged their contents send discharge completion signals c to their associated feeders 2, so that they are fed with articles again from the feeders. The arithmetic and control unit 5 then stands by to receive a start signal s. A description will now be given of a case where the combination weight is not between the upper and lower weight limits. This treatment is characteristic of the present invention. First, the unit causes the combination defectiveness indicator 9 to indicate combination defectiveness. Next, the arithmetic and control unit 5 examines the weight values in the weighing machines 1 and selects three weighing machines 1 corresponding to the last three weight values at the lightweight end of the series.

A concrete method of selecting these three weighing machines 1 will now be described.

(A) The weight value provided by the first weighing machine 1 and stored in the first weight value register is compared with the weight value provided by the second weighing machine 1 and stored in the second weight value register, and the smaller weight value and the number of the corresponding weighing machine 1 are stored in the smallest value register included in the arithmetic and control unit 5. This stored weight value is compared with the weight value stored in the third weight value register, and if the weight value in the smallest value register is smaller, it is allowed to remain as it is, but in the reverse case, the weight value in the third weight value register and the number of the corresponding weighing machine 1 are stored in the smallest value register. Similarly, the weight value in the smallest value register is compared with the weight value in the fourth weight value register, the weight value in the fifth weight value register and so on. Upon completion of comparison of all the weight values, the smallest value register has stored therein the smallest weight value and the number of the corresponding weighing machine 1. The number of the weighing machine 1 corresponding to said smallest weight value is stored in the first storage section of the rank register included in the arithmetic and control unit 5, and the contents of the weight value register for the weighing machine 1 of said number are converted into the greatest value that the weight value register can store, e.g., 999 in the case of 3 digits.

(B) All the weight values are compared, as in (A). Since the weight value register corresponding to the weighing machine 1 associated with the smallest weight value selected in (A) has the greatest value (999) stored therein, there is no possibility of the value in this register being selected again as the smallest. Thus, the smallest weight value in the other weight value registers, namely, the second smallest of all the weight values originally stored, and the number of the weighing machine corresponding thereto are selected.

This number is then stored in the second storage section of said rank register, and the contents of the weight value register for the weighing machine 1 of this number are converted into the greatest value (999).

(C) When the values in the weight value registers are all compared, as in (A), the number of the weighing machine 1 associated with the third smallest weight value is selected.

Additional-feed signals d are sent to the feeders 2 corresponding to the three weighing machines 1 selected in (A), (B), (C). Thereupon, these weighing machines 1 are additionally fed with articles. The operation of the arithmetic and control unit 5 returns to the position (A) in the program. At this time, since articles are not discharged into the packaging machine, that is, since packaging machine is still in the packaging-ready state, the start signal s is still in the arithmetic and control unit 5. Therefore, the arithmetic and control unit 5 stores the weight values associated with all the weighing machines 1 including said additionally fed weighing machines 1 and performs the same procedure. It selects a combination which satisfies the set value, causes the weighing machines 1 corresponding to said combination to discharge their contents, and returns to the position (A) in the program, where it stands by to receive a start signal s. In addition, if a single additional feed fails to provide a combination which satisfies the set value, the combination defectiveness treating routine is entered as in the previous case, causing the combination defectiveness indicator 9 to indicate defectiveness, and three weighing machines corresponding to the last three weight values at the lightweight end of the series are selected and the second additional feeding is effected, whereupon combinatorial computations, etc. are performed again. If this additional feed also fails to provide a combination which satisfies the set value, such additional feed is repeated to provide a combination which satisfies the set value. There might be cases where one or more of the weighing machines 1 go overscale as a result of repeated additional feeds or of malfunction of the feeders 2 in ordinary weighing operation, thus feeding too large amounts. As a countermeasure, an overscale checking procedure is incorporated in the program. If the answer to the question of whether there is an overscale is YES, the corresponding weighing machine is indicated by the overscale indicator 10 and the computing operation is interrupted. Knowing that the computing operation is stopped, the operator suitably removes articles from the corresponding weighing machine and presses the recovery switch 11. The arithmetic and control unit 5, which is repeatedly checking whether the recovery switch 11 is ON in the loop, detects it, whereupon the operation is returned to the position (A) in the program, so that the computing operation is started again.

The foregoing is an embodiment of the invention wherein combination defectiveness in combinatorial weighing is treated and automatically remedied. In the above embodiment, it is checked whether combination weight is between the upper and lower weight limits, but without this condition a particular combination may be found only on the condition of being equal to a set weight. In this case, it is checked whether combination weight is equal to a set weight, and if it is judged that it is not, the operation branches off to the additional-feed routine for treatment of combination defectiveness, which is characteristic of the invention, and combinatorial computations are performed again.

A method of treating combination defectiveness in the case (II) for combinatorial counting will now be described.

This embodiment differs from the preceding one only in that weight in the case of the above described combinatorial weighing (I) is replaced by the number of articles, and therefore a drawing thereof is omitted. In this embodiment, the weight setting section 6 in FIG. 1 is replaced by a number setting section, the upper weight limit setting section 7 by an upper number limit setting section, and the lower weight limit setting section 8 by a lower number limit setting section, and a single-article weight setting section is additionally provided for setting the weight of a single article. Further, in the program shown in FIG. 2, the check on overscale is followed by the step of dividing each of the weight values provided by the respective weighing machines 1 and stored in the arithmetic and control unit 5 by the single-article weight set by the single-article weight setting section to find the number of articles for each of the weighing machines 1, these numbers being then stored. The remainder of the procedure described in case I above is performed with respect to numbers instead of weight.

In this treatment of combination defectiveness in combinatorial counting, the number of articles which is equal to or nearest to a set number is obtained and checked as to whether it is between the upper and lower number limits. If it is found not to be therebetween, combination defectiveness threating routine is entered. In the combination defectiveness treating routine, articles are additionally fed to the three weighing machines 1 corresponding to the last three values at the lightweight end of the series, as in the case of the combinatorial weighing (I) previously described. In another embodiment wherein a particular combination is discharged on condition that the combination number is equal to a set number, however, the combination defectiveness treating routine is followed on condition that the combinations obtained do not include one which is equal to a set number.

Treatment of combination defectiveness in the case of weight-conditioned combinatorial counting (III) will now be described.

The arrangement is as shown in FIG. 3. This is the same as the arrangement shown in FIG. 1 except that it also includes a number setting section 12 and a single article weight setting section 13 for setting the weight of a single article.

The operation will now be described with reference to FIG. 4 showing a flowchart of an operating program for the arithmetic and control unit 5.

At the outset of the counting operation, it is assumed that the weight value of articles to be packaged has been set by the weight setting section 6, that the upper and lower weight limits have been set by the upper and lower weight limit setting sections 7 and 8, respectively, that the weight of a single article has been set by the single-article weight setting section 13, and that the number of articles to be packaged has been set by the number setting section 12.

In this combinatorial counting (III), the condition imposed on the combination ultimately obtained under number and weight conditions is divided into four types: (III-1), (III-2), (III-3) and (III-4).

The condition (III-1) is that the combination number is equal to or nearest to a set number and that the combination weight is between the upper and lower weight limits and is equal to or nearest to a set weight. The condition (III-2) is that the combination number is equal to or nearest to a set number and that the combination weight is equal to or nearest to a set weight. The condition (III-3) is that the combination number is between the upper and lower number limits and is equal to or nearest to a set number and that the combination weight is equal to or nearest to a set weight. The condition (III-4) is that the combination number is between the upper and lower number limits and is equal to or nearest to a set number and that the combination weight is between the upper and lower weight limits and is equal to or nearest to a set weight.

The weight-conditioned combinatorial counting (III) will now be described with reference to an embodiment wherein it is embodied under the condition (III-1).

A flowchart of an example of a program for the condition (III-1) is as shown in FIG. 4. The arithmetic and control unit 5 first checks whether there is a start signal s which is fed in when the packaging machine is ready for packaging. If there is no start signal, it repeats this check until there is one, whereupon it sends selection signals a to the multiplexer 3, whereby weight values provided by the weighing machines 1 are passed through the multiplexer 3 to the A/D converter 4, where they are converted into digital quantities, which are then stored in the arithmetic and control unit 5. Whether the weighing machines 1 are overscale is then judged. If they are not overscale, the weight values provided by the weighing machines 1 are divided by the single-article weight to find the number of articles in each weighing machine 1 and these numbers are then stored. Combinations of these numbers are computed, and the computed combination weights and combinations are stored. Combinations which conform to the set number are examined and stored. Whether there is a combination which conforms to the set number is judged. If it is found that there are one or more of such combinations, the combination weights are computed and the combination which is equal to or nearest to the set value is retrieved. Then whether the retrieved combination is between the upper and lower weight limits is checked. If it is found not to be there-between, the combination defectiveness treating routine to be later described is entered. If it is found to be therebetween, discharge signals b are sent to the weighing machines 1 corresponding to said combination to cause them to discharge their contents, which are then packaged by the packaging machine. During the execution of the program, if it is judged that there is no combination conforming to the set number or that the combination weight is not between the upper and lower weight limits, the combination defectiveness treating routine is entered. In this case, the combination defectiveness indicator 9 is caused to indicate combination defectiveness, and the last three weight values are selected from the series of weight values which are provided by the weighing machines 1 and which are stored in the arithmetic and control unit 5 in the order of decreasing weight, whereupon additional-feed signals d are sent to the feeders 2 corresponding to those three weighing machines 1, causing said feeders to additionally feed the latter with articles, whereupon the operation returns to the position (B) in the program. At this time, since articles are not discharged into the packaging machine, a start signal s has been inputted into the arithmetic and control unit 5, so that the computing operation is started again, as described above. If a combination which satisfies the set value is obtained, articles are discharged from the weighing machines 1 corresponding to said combination, but if it is not obtained, the combination defectiveness treating routine is entered again, additionally feeding small amounts of articles to the three weighing machines corresponding to the last three weight values, whereupon the computing operation is started again. In this way, additional feeding is effected any number of times until a combination satisfying the set condition is obtained. If overscaling should occur as a result of additional feed to the weighing machines 1, overscaling is detected and the overscale indicator 10 is lighted, with the computing operation stopped. In this case, the operator, seeing this, removes articles from the corresponding weighing machine and presses the recovery switch 11, enabling the automatic computing process to be resumed.

When the embodiment in FIG. 3 for selecting a combination to be discharged under said number and weight conditions is performed according to the program shown in FIG. 4, it is so arranged that the combination defectiveness treatment is executed in cases where at least either the number or the weight condition is not satisfied. The conditions and means for executing the combination defectiveness are not limited thereto. For example, only either the number or the weight condition may be designated and defectiveness connected therewith may be remedied by additionally feeding articles, while in the case of defectiveness connected with the other, undesignated condition, a warning may be given to prevent discharge of articles, as in the prior art. Examples of this case includes one in which the combination defectiveness treating routine is entered when a combination whose combination number is equal to the set value is not obtained and in which a warning is given to inhibit discharge of articles when the combination weight deviates from the range between the upper and lower weight limits.

In the case of the conditions (III-2) through (III-4) which the ultimately obtained combinations have, if part of the ultimate conditions is not satisfied, for example, if the combination weight (number) is judged not to be between the upper and lower weight (number) limits, the combination defectiveness treating process is, of course, carried out.

Further, in the case of the conditions (III-1) through (III-4), if it is made a condition that the combination weight (number) should be the nearest to the set weight (number), this condition can be satisfied without fail; therefore, it may be judged whether the combination weight (number) which satisfies this condition is greater or smaller than the set weight (number), and if it is judged to be smaller, the combination defectiveness treatment may be executed.

Further, in the case of the conditions (III-2) through (III-4), one of the number and weight conditions may be designated, so that only when the designated condition is not satisfied the combination defectiveness treatment is carried out.

The methods of increasing or decreasing the amount of articles to remedy combination defectiveness in the case of (I) combinatorial weighing, (II) combinatorial counting, and (III) weight-conditioned combinatorial counting will now be classified.

In the embodiments previously described with reference to FIGS. 1 through 3, additional feed has been performed. However, the methods of increasing or decreasing the amount of articles are classified into three types: (a) articles are additionally fed; (b) articles are decreased in amount; and (c) all the articles are once discharged and then fresh articles are fed.

In the case of additionally feeding articles, mentioned at (a), there are two cases: (1) additionally feeding particular weighing machines 1 conditionally on the weight of the articles in such weighing machines; and (2) additionally feeding weighing machines without such weight condition. In the case (1), one or more of the weighing machines holding articles of less weight are additionally fed with articles, as in the embodiments previously described with reference to FIGS. 1 through 4. In the case (2), one or more of the weighing machines, for example, the first through third weighing machines, to be additionally fed, are predetermined.

In the case (b) of discharging part of the articles to decrease the amount thereof, there are two cases: (1) discharging part of the articles conditionally on weight from one or more of the weighing machines holding articles of greater weight; and (2) discharging part of the articles from any one or more of the weighing machines without such weight condition.

In the case (c) of once discharging all the articles from weighing machines and then re-feeding fresh articles, there are two cases: (1) it is carried out conditionally on weight with respect to one or more of the weighing machines holding articles of greater weight; and (2) it is carried out with respect to predetermined one or more of the weighing machines holding articles of greater weight conditionally on the weight of the articles in such weighing machines; and (2) it is carried out with respect to predetermined one or more of the weighing machines without such weight condition. Further, selection of any one or more of the weighing machines holding articles of greater weight in said (b) and (c) may be made in the same way as selection of three weighing machines holding articles of less weight in the embodiment described above with reference to FIG. 1. The differences are that a maximum value register is provided instead of a minimum value register, that as a result of comparison, the greater value is stored, and that when the maximum value is selected, the minimum value (zero) is stored in the corresponding weight value register.

In addition, in the cases (b) and (c), it is necessary to provide discharge channels separately so as to prevent discharged articles from entering the packaging machine.

Further, if single correction by said (a), (b) and (c) is not sufficient and it is necessary to make correction twice or more, the articles in other weighing machines than those whose articles were previously increased or decreased may be increased or decreased.

The timing for starting normal feed of articles to the weighing machines will now be described. In the embodiments described above, at the time of initialization at the start of operation, all the weighing machines have been fed with articles and a discharge completion signal produced upon completion of single weighing (counting) has been used as a signal to start feeding articles to the empty weighing machines. This timing may be otherwise. For example, it may be so arranged that after the arithmetic and control unit has sent discharge signals to weighing machines corresponding to the discharge combination conforming to a set value, the arithmetic and control unit sends feed start signals to feeders corresponding to the empty weighing machines just when the discharge has been completed.

As for the period of time which determines the amount of additional feed, it may be determined as desired. For example, while the period of time for normal feed is set so that the amount of feed is about $\frac{1}{4}$ to 1/5 of the maximum scale of the weighing machine, the period of time for additional feed may be the same as or longer or shorter than said period of time for normal feed.

The method of computing combinations will now be described.

In the flowcharts for the above described embodiments shown in FIGS. 2 and 4, all the combinations are once computed and a combination weight (number) equal to or nearest to a set weight (number) is retrieved. However, this may be done by any desired method. For example, during combinatorial computation, the present combination weight (number) is compared with the preceding one at all times, so that of the already computed combinations, one which is the nearest to the set weight (number) is stored, thereby ultimately providing one combination.

As many apparently different embodiments of this invention may be made without departing from the spirit and scope thereof, it is to be understood that the invention is not limited to the specific embodiments thereof except as defined in the appended claims.

What is claimed is:

1. The process for obtaining a combination of articles of a target weight comprising the steps of:

weighing groups of articles with a plurality of weighing machines;

computing the sum weight of articles for every combination of said groups of articles;

selecting a particular combination, the sum weight of articles of which is equal to or nearest said target weight and within a preset range of allowance;

if no combination satisfies the criteria for selection, selecting at least one of said weighing machines and decreasing the amount of the articles therein or feeding in additional fresh articles; and repeating the same operation from the beginning.

2. The process as defined in claim 1, wherein at least one weighing machine is selected from among the weighing machines in ascending order of weight of articles therein for addition of fresh articles.

3. The process as defined in claim 1, wherein at least one weighing machine is selected from among the weighing machines in descending order of weight of articles therein for subtraction of articles.

4. The process as defined in claim 1, wherein at least one weighing machine is selected from among the weighing machines and the articles therein are evacuated and fresh articles are resupplied.

5. The process as defined in claim 4, wherein said selection is made in ascending order of weight of articles.

6. The process as defined in claim 4, wherein said selection is made in descending order of weight of articles.

7. The process for obtaining a combination of articles of a described number comprising the steps of:

weighing groups of articles with a plurality of weighing machines;

dividing the weight of articles in each group obtained by each weighing machine by the unit weight of an article to find the number of articles therein;

computing the sum of the number of articles for every combination of said groups of articles;

selecting a particular combination, the sum of the number of articles of which is equal to or nearest said desired number and within a preset range of allowance;

if no combination satisfies the criteria for selection, selecting at least one weighing machine and adding fresh articles to or subtracting articles from the articles therein; and repeating the same operation from the beginning.

8. The process as defined in claim 7, wherein at least one weighing machine is selected from among the weighing machines in ascending order of weight of articles therein for addition of fresh articles.

9. The process as defined in claim 7, wherein at least one weighing machine is selected from among the weighing machines in descending order of weight of articles therein for subtraction of articles.

10. The process as defined in claim 7, wherein at least one weighing machine is selected from among the weighing machines and the articles therein are evacuated and fresh articles are resupplied.

11. The process as defined in claim 10, wherein said selection is made in ascending order of weight of articles.

12. The process as defined in claim 10, wherein said selection is made in descending order of weight of articles.

* * * * *